H. LENTZ.
VALVE ARRANGEMENT FOR FLUID TRANSMISSION GEARS.
APPLICATION FILED SEPT. 1, 1909.

986,834. Patented Mar. 14, 1911.

WITNESSES:
W. H. Berrigan
Alfred R. Anderson

INVENTOR.
HUGO LENTZ,
by Ivan Odenval
Attorney.

UNITED STATES PATENT OFFICE.

HUGO LENTZ, OF MANNHEIM, GERMANY.

VALVE ARRANGEMENT FOR FLUID-TRANSMISSION GEARS.

986,834. 
Specification of Letters Patent. 
Patented Mar. 14, 1911.

Application filed September 1, 1909. Serial No. 515,703.

*To all whom it may concern:*

Be it known that I, HUGO LENTZ, a subject of the German Emperor, and residing at Mannheim, Germany, have invented a new and useful Valve Arrangement for Fluid-Transmission Gear; and I do hereby declare the following to be a full, clear, and exact description of the same.

The present improvements relate to valves especially useful for pressure pumps of fluid transmission gear, and the object of the invention is the production of a valve for throwing into action one or more pressure pumps.

This invention may be used with especial advantage in that form of transmission gear described in my pending application, Serial No. 514,742, filed August 26, 1909, for Letters Patent, in which are employed two pressure pumps and two pressure motors, a valve (which may be that of the present invention) being used to set in action either or both of the pumps.

The form of the invention illustrated in the accompanying drawings shows a relieved rotary valve for the primary pumps of fluid transmission gear in motor cars, by means of which it is possible to switch on and off, separately or simultaneously, the pumps directly driven from the motor, in order to cause a quantity of fluid, corresponding to the desired speed, to act on the motors (or secondary pumps) which rotate the wheels of the car, or to produce a stoppage thereof.

The accompanying drawings show an embodiment of my invention.

Figure 1:
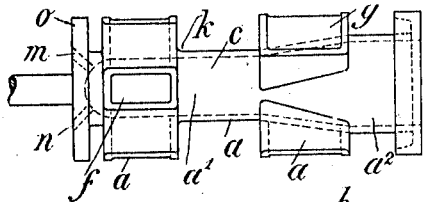
Figure 2:
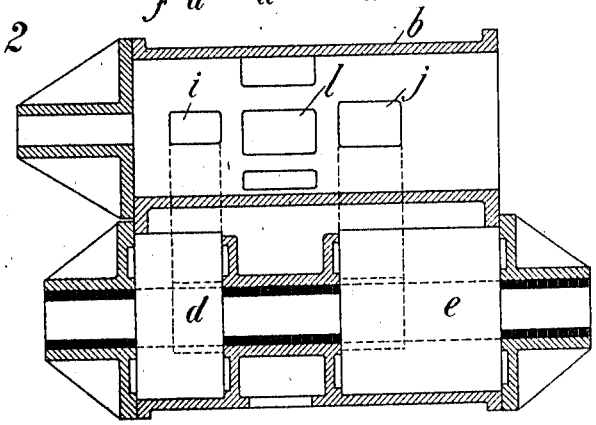
Figure 3:
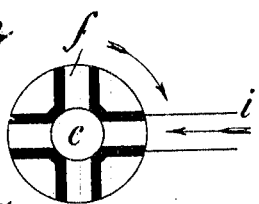
Figure 4:
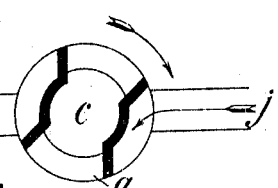

Figure 1 is a front view of a valve for throwing into action either or both of two primary pumps (rotary); Fig. 2 is a longitudinal section of a valve casing, and of a pump casing with the pumps inserted; Figs. 3–10, to be read in pairs, (first) 3 and 4, (second) 5 and 6, (third) 7 and 8, (fourth) 9 and 10, indicate the relation of the various valve-ports to the primary pumps, at various positions of the valve corresponding to the different speeds of the motors and to the car when stationary.

The valve $a$ (Fig. 1) is in use, revolubly arranged in the valve casing $b$ (Fig. 2). Said valve is hollow, with the chamber $c$ thereof made larger at one end ($a^2$) than at the other ($a^1$), to avoid throttling, and loss of speed, when the increased quantity of fluid is forced in upon putting the larger pump into action. The valve has two sets of ports, ports $f$ being intended for connecting the chamber $c$ of the valve with pressure pump $d$ and ports $g$ for connecting said valve chamber with pressure pump $e$. There are shown four equidistant ports $f$, and two ports $g$. As will be seen, ports $f$ differ from ports $g$ in dimensions, number and arrangement. The four ports $f$ of the valve serve to, separately, throw into action the pump $d$, and are arranged crosswise, while the two ports $g$, which separately serve to throw pump $e$ into action, face one another. In the example illustrated, it is assumed that pump $e$ has double the width of pump $d$, other conditions being similar. The space between the ports $f$ and the ports $g$, constitutes an annular passage $k$.

Figure 5:
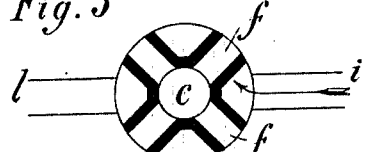
Figure 6:
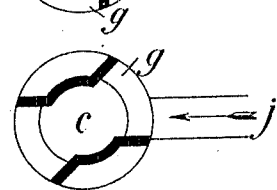
Figure 7:
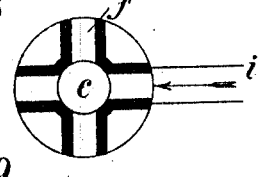
Figure 8:
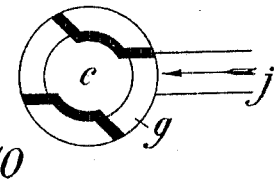
Figure 9:
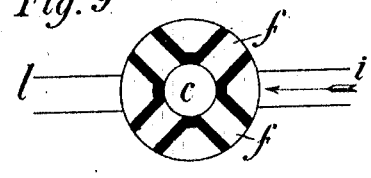
Figure 10:
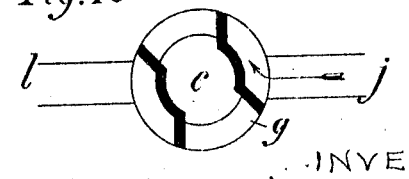

In operation, the valve is so fitted within the valve-casing $b$, that the ports $f$ may, successively, be brought into register with a pressure pipe $i$ leading from pump $d$, while the ports $g$ may, successively, be brought into register with a pressure pipe $j$ leading from pump $e$. The casing $b$ is provided with a suction port, $l$, common to both pumps, and the valve is so recessed or formed between successive ports $f$ as well as between successive ports $g$, that when any port of a series is not in register with the pipe $i$, or with the pipe $j$, the pressure fluid from the pump ($d$ or $e$) passes into the recessed part between ports, into the annular passage $k$ and thence to suction port $l$. If the valve is turned, in the direction of the short arrow (Fig. 4) to the position shown in Figs. 3 and 4, the pump $d$ is then, through the pipe $i$, and one of the ports $f$, connected with the valve-chamber $c$, and, through said chamber, with any motor or motors. At the same time, however, the port $g$ is not in communication with the pipe $j$, but the liquid from pump $e$ passes (as shown by the long arrow), by way of the recess between the ports, into the annular passage $k$ and then to the suction pipe $l$, for circulation through that pipe. Thus only pump $d$ is connected with the valve chamber. Upon further turning of the valve, in the same direction as before, as shown in Figs. 5 and 6, no port $f$ is in communication with pump $d$, while a port $g$ has been brought into register with the pipe $j$ and only the pump ($e$) of greater capacity is in communication with the valve chamber. The fluid from the pump $d$ passes by way of the recess between successive ports *f* to the suction pipe *l*, and is circulated through that pipe. In a third position (that shown in Figs. 7 and 8, read together) of the valve, both pipes *i* and *j* are in communication with the valve chamber *c* (the suction pipe *l* being cut entirely off) and the combined pressure fluid from both pumps will operate any motor or motors. In a fourth position (that shown in Figs. 9 and 10, read together) of the valve, no port of either set is in communication with a pump, and there is no fluid passing through the valve-chamber; on the contrary, each pump is driving fluid through the recesses between successive ports *f* and between successive ports *g*, and, by the annular passage *k* and suction port *l*, fluid is being circulated by both pumps. In this position, the motor or motors are cut out and the car is at rest.

Because of the exceedingly high pressure arising when employing fluid transmitting gear, care must be taken that the valve shall be relieved as far as possible. As shown in Fig. 1, this may be assured by having small passages (*m*, *n*) in the end *o* of the valve, so that a connection is established with the valve chamber, and thus an effective relieving is assured.

What I claim is:

1. In combination, a valve-casing having a suction port, a pressure-pump connected by a port with said valve-casing, a second pressure-pump of greater capacity and also connected by a port with said valve-casing, a hollow rotary valve in said valve-casing having a valve-chamber and a succession of ports for connection of the valve-chamber with the first-mentioned pump and also having a separate succession of ports for connection of the valve-chamber only with the second-mentioned pump, said valve being also formed to connect a pump with the suction port.

2. In combination, a valve-casing having a suction port, a pressure pump connected by a port with said casing, a second pressure pump of greater capacity also connected by a port with said casing, and a rotary valve in said casing comprising a shell having an inner chamber extending the entire length thereof and ports formed to successively connect up only the first-named pump for operating a motor, then to connect up only the pump of greater capacity for operating a motor, then to simultaneously connect up both pumps for operating a motor, and, finally, to render both pumps ineffective for motor operation.

3. In combination, a valve casing having a suction port, pressure pumps separately connected with the valve-casing, a hollow valve therein and an annular passage between the valve and valve-casing and in communication with the suction port, said valve formed for connecting either of said pumps with the interior of the valve or with the annular passage.

In testimony whereof, I have signed my name to this specification in the presence of two subscribing witnesses.

HUGO LENTZ.

Witnesses:
C. FRANZ,
ERNEST L. IVES.